(12) United States Patent
Park et al.

(10) Patent No.: US 12,362,949 B2
(45) Date of Patent: Jul. 15, 2025

(54) BLOCKCHAIN APPARATUS AND METHOD FOR MOBILE EDGE COMPUTING

(71) Applicant: POSTECH Research and Business Development Foundation, Pohang-si (KR)

(72) Inventors: Chanik Park, Pohang-si (KR); Yong Rae Jo, Pohang-si (KR)

(73) Assignee: POSTECH RESEARCH AND BUSINESS DEVELOPMENT FOUNDATION, Pohang-si (KR)

(*) Notice: Subject to any disclaimer, the term of this patent is extended or adjusted under 35 U.S.C. 154(b) by 148 days.

(21) Appl. No.: 17/965,655

(22) Filed: Oct. 13, 2022

(65) Prior Publication Data
US 2023/0208659 A1  Jun. 29, 2023

(30) Foreign Application Priority Data
Dec. 29, 2021  (KR) .................. 10-2021-0191559

(51) Int. Cl.
*H04L 9/32* (2006.01)
*H04L 9/00* (2022.01)
*H04L 9/40* (2022.01)

(52) U.S. Cl.
CPC ............ *H04L 9/50* (2022.05); *H04L 63/1466* (2013.01)

(58) Field of Classification Search
CPC ... H04L 9/50; H04L 63/1466; H04L 2209/80; H04L 67/289; H04L 9/3236; H04L 67/1093; H04L 67/51; G06F 16/1837
See application file for complete search history.

(56) References Cited

U.S. PATENT DOCUMENTS

| | | | |
|---|---|---|---|
| 11,133,983 B2 | 9/2021 | Obaidi et al. | |
| 11,270,300 B1 * | 3/2022 | Vijayaraghavan | ... G06Q 20/389 |
| 2019/0182313 A1 | 6/2019 | Yoo et al. | |

FOREIGN PATENT DOCUMENTS

| | | | | |
|---|---|---|---|---|
| CN | 110245951 B | * | 4/2021 | ......... G06F 21/6245 |
| CN | 113010922 A | * | 6/2021 | ............ G06F 16/27 |
| KR | 20190067581 A | | 6/2019 | |

(Continued)

OTHER PUBLICATIONS

"An Intelligent Edge-Chin-Enabled Access Control Mechanism for IoV" to Yuanni Liu, Aug. 1, 2021, IEEE (Year: 2021).*

(Continued)

*Primary Examiner* — Duan Zhang
(74) *Attorney, Agent, or Firm* — Morgan, Lewis & Bockius LLP

(57) ABSTRACT

Disclosed is a blockchain apparatus and method for mobile edge computing, the blockchain method comprising: receiving a user transaction from clients associated with a first edge chain, determining an execution order for transactions, processing the transactions according to the transaction processing order, reading and updating data on the first edge chain or reading and updating the data on a main chain of the main network depending on presence or absence of locality in the user transaction, creating an edge chain block by collecting the results of a batch of processed transaction, propagating the edge chain block to all local BSP auditor nodes associated with the first edge chain and all BSP servers in the main network.

6 Claims, 9 Drawing Sheets

(56) References Cited

FOREIGN PATENT DOCUMENTS

WO     WO-2020022958 A1 *   1/2020
WO     WO-2022041901 A1 *   3/2022    ............. G06F 16/27

OTHER PUBLICATIONS

"A software defined fog node based distributed blockchain cloud architecture for IoT" to Jong Hyuk Park,, Sep. 29, 2017, IEEE (Year: 2017).*

Y. Jo, J. Ma and C. Park, "Toward Trustworthy Blockchain-as-a-Service with Auditing," 2020 IEEE 40th International Conference on Distributed Computing Systems (ICDCS), Singapore, Singapore, 2020, pp. 765-775, doi: 10.1109/ICDCS47774.2020.00068.

* cited by examiner

BLOCKCHAIN APPARATUS AND METHOD FOR MOBILE EDGE COMPUTING

CROSS REFERENCE TO RELATED APPLICATION

The present application claims priority to Korean Patent Application No. 10-2021-0191559, filed Dec. 29, 2021, the entire contents of which is incorporated herein for all purposes by this reference.

BACKGROUND

1. Technical Field

The present disclosure relates to a blockchain apparatus and method for mobile edge computing environment that performs a blockchain operations in consideration of the environmental characteristics of mobile edge computing.

2. Related Art

The $5^{th}$ generation (5G) network technology enables mobile edge computing (MEC) environment to support ultra-low latency and high-performance services. Unlike conventional centralized cloud computing, mobile edge computing is a distributed computing system that provides low latency services to users by arranging computing resources in a location physically close to user mobile terminals, e.g., a base station.

The MEC consists of sets of edge nodes and clients deployed in each region. Each edge node processes transactions submitted by clients within the same region. Because MEC utilizes the locality characteristic of the workload, in many cases, most transactions can be quickly processed only with local data without performing a complex distributed coordination protocol between multiple edge nodes. However, the clients in the region must rely on a centralized single edge node, which can pose a potential security threat, that is, deteriorate decentralization property in a service.

Therefore, in order to enhance the security of the MEC, there may be a method of applying a general public or permissioned blockchain technology to the MEC, but a straightforward application of the existing blockchain technology to the MEC undermines MEC's unique advantages because of the resource constraint characteristics of the user terminal and the high execution overhead of the blockchain. Moreover, communication constraints in the MEC environment are not considered.

Meanwhile, there may be a method to construct a blockchain platform by introducing Blockchain as a Service (Baas) into the 5G communication environment. However, such a blockchain platform still has limitations in performance because the platform does not utilize edge computing environment at all. Moreover, an edge node in MEC is considered a centralized structure from a client's point of view, which is not effectively accommodated in a blockchain platform.

SUMMARY

The present disclosure has been derived to solve the problems of the prior art, and an object of the present disclosure is to provide a blockchain method and apparatus capable of solving potential security threats in an environment in which a single mobile edge computing (MEC) node performs blockchain service operations for clients in a single region. An edge node performing blockchain service operations is named as a Blockchain Service Provider (BSP) server. A BSP server is a centralized server, but audited by a certain number of user devices, named BSP auditors or local auditors.

Another object of the present disclosure is to provide a blockchain apparatus and method for an MEC environment, which is capable of preventing a BSP server from maliciously modifying client transactions in an edge network and trying blockchain fork attacks, i.e., sending conflicting blocks with different block hash values on the same block height. A BSP server is monitored and audited by a certain number of BSP auditors.

Still another object of the present disclosure is to provide a blockchain apparatus and method for an MEC environment, which supports high performance blockchain services by utilizing multiple edge nodes and introducing a BSP server that is centralized but being audited by BSP auditors in blockchain operations.

Another object of the present disclosure is to provide a blockchain apparatus and method for an MEC environment, which enables efficient execution of user transactions by introducing edge chain and main chain. An edge chain is managed by a BSP server and a set of BSP auditors. The main chain is managed by all BSP servers.

According to an exemplary embodiment of the present disclosure, a blockchain method of a BSP server including at least one processor configured to execute computer-readable instructions stored in a memory and connected to a main network, the method comprising: receiving a user transaction from clients associated with a first edge chain or an audit transaction sent from local BSP auditor nodes associated with the first edge chain: determining an execution order for transactions including the user transaction or the audit transaction: processing the transactions according to a transaction processing order corresponding to the execution order: reading and updating data on the first edge chain or reading and updating the data on a main chain of the main network depending on presence or absence of locality in the user transaction: creating an edge chain block by collecting the results of a batch of processed transaction: propagating the edge chain block to all local BSP auditor nodes associated with the first edge chain and all BSP servers in the main network The method may further comprise receiving an edge chain block from a BSP server associated with the first edge chain: traversing the transactions in the edge chain block: determining the presence or absence of malicious attacks by any of a BSP server; and sending an audit transaction to a BSP server associated with the first edge chain based on the previous decision.

The method may further comprise transmitting a result event from a BSP auditor to the client.

The method may further comprise creating a second block on the first edge chain comprising all the user transactions and main chain audit transactions received from other BSP servers in the main network and propagating the second block to BSP auditors on the first edge chain and other BSP server nodes on the main network, wherein an on-chain audit result from the BSP auditor node performing on-chain audit on the second block is inserted into the first edge chain.

The method may further comprise transmitting a update result of consensus state to the clients which is determined by analysis on all audit transactions for the main chain.

The method may further comprise: receiving a second block of a BSP server managing a second edge chain of another region from the main network; creating a main chain block by ordered-collection of all the second blocks from all BSP servers; performing validation based on multi-version concurrency control by traversing the transactions in the main chain block: creating a main chain audit transaction for the main chain block; and propagating the main chain audit transaction to the main network for further on-chain audit on the main chain.

The method may further comprise: creating an edge chain block storing all client transactions and audit transactions by a BSP server on the first edge chain and propagating the edge chain block to the BSP auditor nodes on the first edge chain and all the BSP servers in the main network, wherein auditor nodes performs on-chain auditing, including the inspection of the behavior of the BSP server on the first edge chain, the creation of an audit transaction on the edge chain block, and the transmission of the audit transaction to the BSP server on the first edge chain; and transmitting update result of consensus state to the client based on on-chain auditing.

According to another exemplary embodiment of the present disclosure, a blockchain method of a BSP server including at least one processor configured to execute computer-readable instructions stored in a memory and connected to a main network, the method comprising: performing transaction processing on a request for service use received from a user terminal and storing the request in a local edge chain: propagating a result of the transaction processing to local BSP auditors in the form of an edge chain block: broadcasting the local edge chain blocks to BSP servers in other regions constituting the main network; and maintaining a global blockchain named main chain by ordered-collection the edge chain blocks of the BSP servers of the other regions.

The method may further comprise classifying, by the BSP server, the transactions into a user transaction, an audit transaction, and a cooperative transaction, wherein the user transaction comprises an intra-region transaction and an inter-region transaction, the audit transaction comprises a mainchain audit transaction and an edge chain audit transaction, and the cooperative transaction comprises a new-view transaction indicating transfer proof information for migrating to a new BSP server.

The user transaction may comprise, five consensus states of an edge chain speculation, an edge chain ordered, an edge chain commitment, a main chain ordered, and a main chain commitment, each consensus state having a result value of commit or abort. Also, a reliability level of the consensus state of the user transaction may be raised to a next level or terminated early depending on a result of commit or abort in the enumerated order of the edge chain speculation, the edge chain ordered, the edge chain commitment, the main chain ordered, and the main chain commitment.

The audit transaction may comprise a main chain audit transaction and an edge chain audit transaction, the main chain audit transaction comprises a main chain block number, a hash value of a previous block of the main chain, a current hash value of the main chain, a set of hash chain blocks in the main chain, and an inter-transaction execution result including abort or commit bit and a read/write set. Also, the main chain audit transaction may comprise an identity of a current active BSP server, an identity of a BSP server waiting for a next turn, a main chain block creation rule, and a signature of the BSP server that created a main chain block.

The edge chain audit transaction may comprise an edge chain block number, an edge chain block previous hash value, an edge chain block hash value, an identity of BSP auditor, an identity of a currently active BSP server, an identity of a BSP server waiting for a next turn, and a signature of BSP auditor.

The method may further comprise receiving, after the step of exchanging, information determining whether or not to commit the user transaction from the user terminal, wherein whether or not to commit the user transaction is determined selectively by applying a transaction commitment policy to the event message received through the transaction consensus level change event stream by an aggregator module of the user terminal, and the event message comprises a transaction identity, a consensus state level, and information on whether to commit the consensus state.

The main chain as a global blockchain may comprise a set of a plurality of main chain blocks, and each main chain block comprises a main chain header, an edge chain block set, and a signature.

The main chain header may comprise a main chain block number, a main chain previous block hash value, an edge chain block header set included in the main chain block, a Merkle root hash value comprising a header set, and main chain creation rule.

According to still another exemplary embodiment of the present disclosure, a blockchain apparatus connected to a main network and performing a blockchain method, the apparatus comprising: a processor; and a memory storing at least one instruction executed via the processor, wherein the at least one instruction is configured for the processor to perform transaction processing on a request for service use received from a user terminal and storing the request in a local edge chain: propagate a result of the transaction processing to local BSP auditors in the form of a block; broadcast the local edge chain blocks to BSP servers in other regions constituting the main network; and maintain a global blockchain named main chain by ordered-collection of the edge chain blocks of the BSP servers of the other regions.

The processor may be configured to further enable the BSP servers to classify the transactions into a user transaction, an audit transaction, and a cooperative transaction, the user transaction comprises an intra-region transaction and an inter-region transaction, the audit transaction comprises a mainchain audit transaction and an edge chain audit transaction, and the cooperative transaction comprises a new-view transaction indicating transfer proof information for migrating to a new BSP server.

The user transaction may comprise five consensus states of an edge chain speculation, an edge chain ordered, an edge chain commitment, a main chain ordered, and a main chain commitment, each consensus state has a result value of commit or abort, and a reliability level of the consensus state of the user transaction is raised to a next level or terminated early depending on a result of commit or abort in the enumerated order of the edge chain speculation, the edge chain ordered, the edge chain commitment, the main chain ordered, and the main chain commitment.

The audit transaction may comprise a main chain audit transaction and an edge chain audit transaction, the main chain audit transaction comprises a main chain block number, a hash value of a previous block of the main chain, a current hash value of the main chain, a set of hash chain blocks in the main chain, and an inter-transaction execution result including abort or commit bit and a read/write set, and the main chain audit transaction further comprises a current active BSP server identity, an identity of a BSP server waiting for a next turn, a main chain block creation rule, and a signature of the BSP server that created a main chain block.

The edge chain audit transaction may comprise an edge chain block number, an edge chain block previous hash value, an edge chain block hash value, an identity of a BSP auditor, an identity of a currently active BSP server, an identity of a BSP server waiting for a next turn, and a signature of a BSP auditor.

The main chain as a global blockchain may comprise a set of a plurality of main chain blocks, each main chain block comprises a main chain header, an edge chain block set, and a signature, and the main chain header comprises a main chain block number, a main chain previous block hash value, an edge chain block header set included in the main chain block, a Merkle root hash value comprising a header set, and main chain creation rule.

DETAILED DESCRIPTION OF THE EMBODIMENTS

Figure 1:
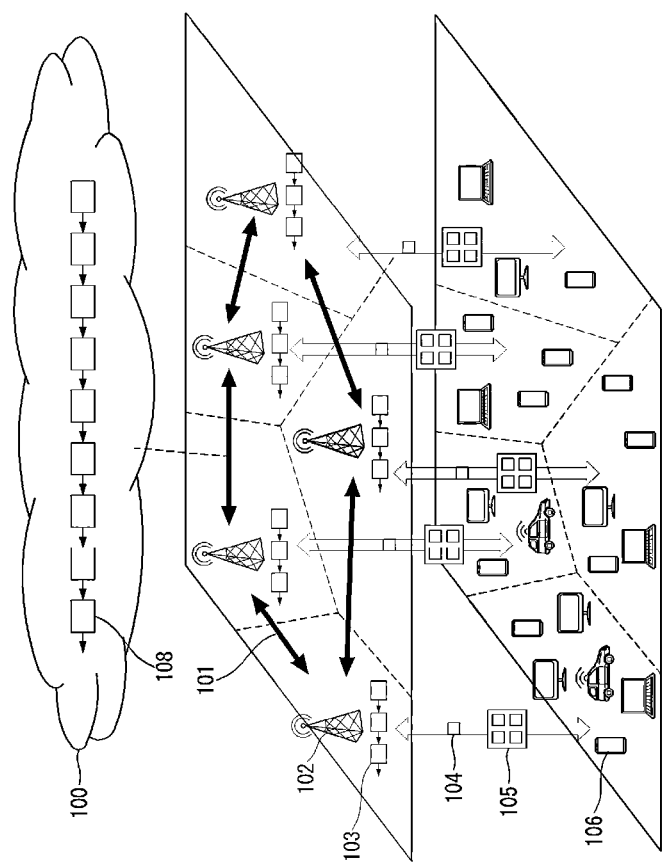
FIG. 1 is an exemplary diagram illustrating a structure of a multi-level blockchain system considering locality in a mobile edge computing environment according to an embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is an exemplary diagram illustrating a structure of a multi-level blockchain system considering locality in a mobile edge computing environment according to an embodiment of the present disclosure.

With reference to FIG. 1, the multi-level blockchain system includes a user terminal 106, a blockchain service provider (BSP) 102, an edge chain 103 independent in a single region, and a main chain 108 ensuring global consistency between regions.

The user terminal 106 transmits the transaction 104, which is a request for service use, to the BSP 102. The user terminal 106 may be a mobile terminal having a communication function, a portable electronic device, a small computing device, a vehicle-mounted device, and the like. The user terminal 106 is a blockchain-based service user and may be referred to as a client, a client node, or a user client node, or local BSP auditors.

The BSP 102 processes the transaction received from the user terminal 106, stores processed transaction in the local edge chain 103, and propagates the result to the local BSP auditors in the corresponding area in the form of a block 105. The BSP 102 also exchanges, as denoted by reference number 101, blocks generated from BSPs in different regions with each other to check and analyze the state of each edge chain of the different regions and to configure a globally consistent state of the blockchain. The BSP 102 may be installed in a base station or a data center located close to a wireless network, and may be referred to as a BSP node.

In the present embodiment, the edge chain 103 is a blockchain managed by the BSP 102 region-independently and is configured to be optimized for high-performance processing for region-independent transactions, i.e., intra-transaction (Intra Tx) and to ensure stability of the blockchain transaction 104 with the execution of Byzantine agreement protocol between BSP auditor (Auditors) in the region.

In addition, in the present embodiment, the main chain 108 is a blockchain located in the main network 100 and managing each BSP 102 of multiple regions globally, supports processing for inter-transaction (Inter Tx) as a dependent transaction of multiple regions, and may be managed by an consensus protocol between blockchain service providers.

Figure 2:
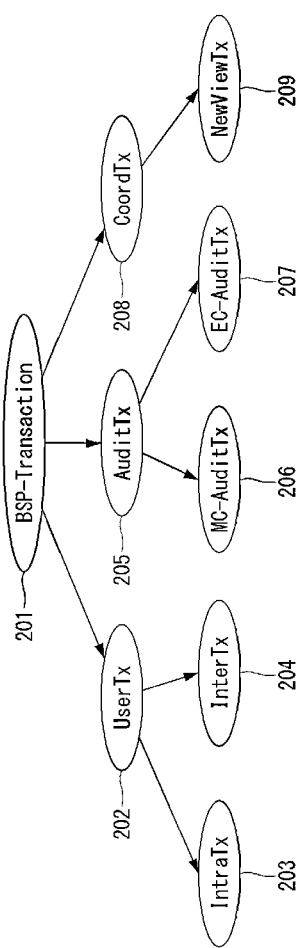
FIG. 2 is a diagram illustrating a classification of a blockchain transaction process of a blockchain service provider (BSP) applicable to a blockchain method for a mobile edge computing environment according to an embodiment of the present disclosure.

FIG. 2 is a diagram illustrating a classification of a blockchain transaction process of a BSP applicable to a blockchain method for a mobile edge computing environment according to an embodiment of the present disclosure.

With reference to FIG. 2, the BSP-transaction 201 is divided into a user transaction (UserTx) 202, an audit transaction (AuditTx) 205, and an inter-node cooperative transaction (CoordTx) 208.

The user transaction 202 may be classified into an intra-transaction (IntraTx) 203 as a transaction within a region and an inter-transaction (InterTx) 204 as a transaction between regions according to locality. The intra-transaction 203 indicates a case in which all of the blockchain states accessed by the corresponding transaction belong to the edge chain managed by the local BSP. Meanwhile, the inter-transaction 204 indicates a case in which at least a part of the state of the blockchain accessed by the transaction belongs to an edge chain managed by a BSP in another region.

The audit transaction 205 may be classified into a main chain audit transaction (MC-AuditTx) 206 and an edge chain audit transaction (EC-AuditTx) 207 depending on the target. Each of the two audit transactions 206 and 207 is used to provide safety and liveness for the operation of the main chain and edge chain.

The cooperative transaction 208 may include a new view transaction (New View Tx) 209 indicating transfer proof information to a new BSP.

Figure 3:
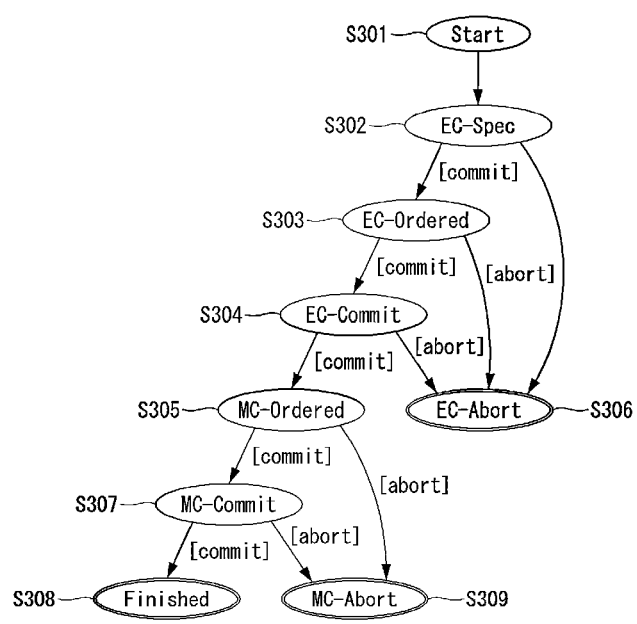
FIG. 3 is a diagram illustrating consensus state transition of a single transaction that is applicable to a blockchain method for a mobile edge computing environment according to an embodiment of the present disclosure.

FIG. 3 is a diagram illustrating consensus state transition of a single transaction that is applicable to a blockchain method for a mobile edge computing environment according to an embodiment of the present disclosure.

With reference to FIG. 3, the consensus state of a single transaction may have five states, i.e., edge chain speculation (Edgechain Speculation), edge chain ordered (Edgechain Ordered), edge chain commitment (Edge Chain Commit), main chain ordered (Mainchain Ordered), and main chain commitment (Mainchain Commit), and each state may have a result value of commit or abort.

The reliability level of the consensus state of a single transaction may be raised to the next level or terminated early depending on the result of commit or abort.

In more detail, when a client creates a transaction for the first time, the transaction is in the initial start state S301. When the BSP executes the transaction, the initial start state S301 of the transaction transitions the edge chain speculation state (EC-Spec) S302.

The edge chain speculation state S302 has a result value of commit or abort depending on whether the BSP has successfully performed the corresponding transaction locally. When the edge chain speculation (EC-spec) is committed and hash chain consistency is ensured by the BSP auditor for the block containing the corresponding transaction, the consensus state is updated from the edge chain speculation state S302 to an consensus state, i.e. the edge chain ordered state (EC-ordered) S303. Meanwhile, when the hash chain consistency verification fails, the edge chain speculation state S302 is updated to the edge chain abortion state (EC-abort) S306.

Next, when the edge chain ordered state S303 is committed, the Byzantine block agreement is performed between the BSP auditors, and as a result, the state transitions to the edge chain commitment (EC-commit) state S304. That is, when the BSP creates and propagates the correct block, the edge chain ordered state S303 is updated to the edge chain commitment state S304, but when the BSP creates and propagates an incorrect block, the edge chain ordered state S303 transitions to the edge chain abortion state S306.

Afterward, the edge chain commitment state S304 is updated to the consensus state of the main chain ordered (MC-ordered) state S305 at the time when the transaction is included in the main chain managed by the BSP. Meanwhile, when the corresponding transaction is not included in the main chain managed by the BSP, the edge chain commitment state S304 is updated to the consensus state of the main chain abortion state S309.

Finally, when the main chain block is finally determined by consensus between blockchain service providers in the main chain ordered state S305, the main chain ordered state S305 transitions to the consensus state of the main chain commitment (MC-commit), i.e., the main chain commitment state S307. Meanwhile, when the result of the corresponding state is committed, the state transitions to the final finish state S308 and, otherwise, the state transitions to the main chain abortion state S309, which is the final failure state.

Figure 4:
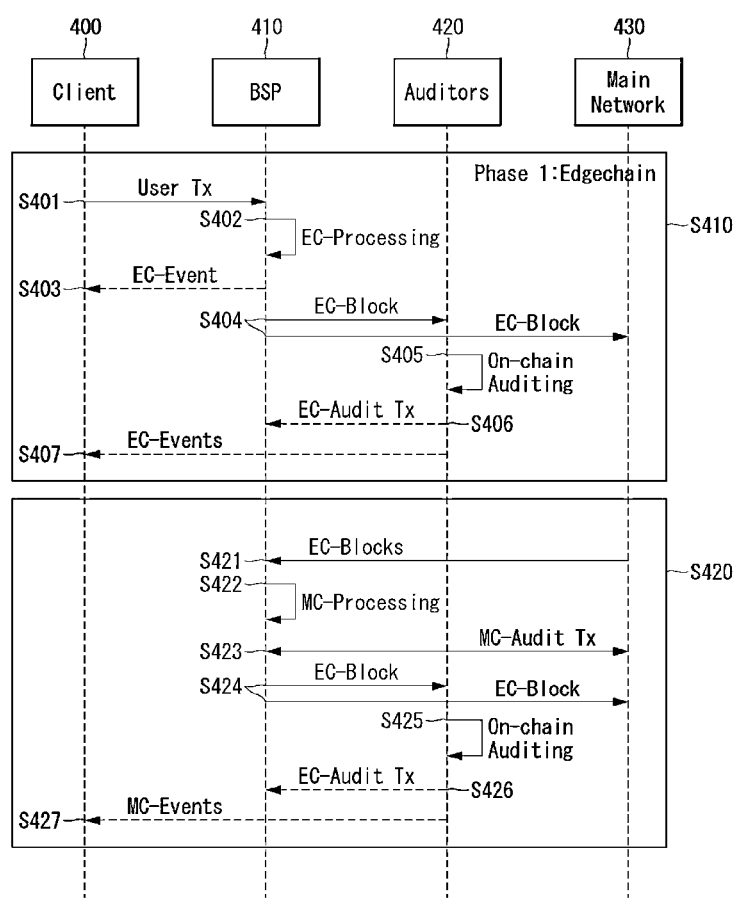
FIG. 4 is a signal flow diagram illustrating a transaction processing flow from a time point when a client submits a transaction to being inserted into a main chain in a blockchain method for a mobile edge computing environment according to an embodiment of the present disclosure.

FIG. 4 is a signal flow diagram illustrating a transaction processing flow from a time point when a client submits a transaction to being inserted into a main chain in a blockchain method for a mobile edge computing environment according to an embodiment of the present disclosure.

With reference to FIG. 4, the transaction processing may be divided into two stages: an edge chain (Edgechain) processing stage S410 and a main chain (Mainchain) processing state S420. The edge chain processing stage S410 may be referred to as a first phase (phase 1), and the main chain processing stage S420 may be referred to as a second phase (phase 2), respectively.

In the edge chain processing stage S410, first, the client 400 creates a user transaction (User Tx) on the edge chain in a specific region, and transmits, at step S401, the created user transaction to the BSP 410.

A user transaction may include a program name, such as a smart contract name and a function name, and argument information required to perform a blockchain transaction.

Next, the BSP 410 locally processes the user transaction through an edge chain processing (EC-Processing) process at step S402, and transmits the processed result event to the client 400 at S403. The result event may be referred to as an edge chain event (EC-Event) or a first edge chain event.

The edge chain processing process includes assigning a processing order of transactions and performing general transactions in the assigned order and may read and update data on the edge chain or the main chain depending on the presence or absence of locality.

Next, the BSP 410 collects the processed transactions to generate a block, and propagates, at step S404, the created block to the main network 430 composed of local auditor (Auditors) 420 and other local blockchain service providers. The block may be referred to as an edge chain block (EC-Block). The local auditor may be referred to as the BSP auditor or the BSP auditor node.

The BSP auditor 420 that has received the block from the BSP 410 may traverse and analyze the transactions in the block through an on-chain auditing procedure at step S405. The analysis result may be included in the audit transaction and transmitted from the BSP auditor 420 to the BSP 410 at step S406. The audit transaction may be referred to as an edge chain audit transaction (EC-Audit Tx).

The BSP auditor 420 may also read and analyze the transactions for auditing in the block to verify whether there is a violation of stability and operability, and transmit the result events to the client 410 at step S407. The result events may be referred to as edge-chain events (EC-Events) or second edge chain events.

In the main chain processing stage of S420, first, the BSP 410 receives, at step S421, the blocks from the main network 430 composed of blockchain service providers in other regions.

Next, the BSP 410 creates and processes a main chain block through a main chain processing (MC-Processing) process at S422. In more detail, the main chain processing process may generate a main chain block including other region edge chain blocks (EC-Blocks) received from the main network 430 and perform validation based on Multi-version Concurrency Control (MVCC) by traversing all transactions in the created main block.

Then, the BSP 410 generates a main chain audit transaction (MC-Audit Tx) for the main chain block and propagates it to the main network 430 to share it with other BSPs.

The BSP in each region creates a block containing the main chain audit transactions received from each other as an edge chain block on its own edge chain and propagates, at step S424, the block created on the edge chain to the corresponding BSP auditor 420 and the main network 430.

The BSP auditor 420 performs, at step S425, on-chain auditing on the block containing the main chain audit transaction, and transmits, at step S426, the audit result to the BSP 410 to reflect it on the edge chain. The audit result can be referred to as an edge chain audit transaction (EC-Audit Tx). The BSP auditor 420 may transmit, at step S427, the update result information of the consensus state to the client 400 based on the main chain level audit transaction.

Figure 5:
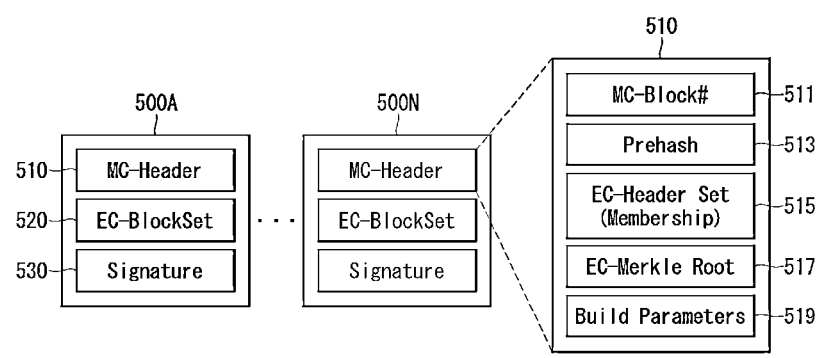
FIG. 5 is a diagram illustrating a data structure of a main chain employable in a blockchain method for a mobile edge computing environment according to an embodiment of the present disclosure.

FIG. 5 is a diagram illustrating a data structure of a main chain employable in a blockchain method for a mobile edge computing environment according to an embodiment of the present disclosure.

With reference to FIG. 5, the main chain includes a set of main chain blocks 500A and 500N, and each main chain block includes a main chain header 502, an edge chain block set (EC-BlockSet) 503, and a signature 504 of the main chain block generator.

In addition, the main chain header 510 includes a main chain block number (MC-Block #) 511, a hash value (Pre-hash) 513 of the previous block of the main chain, a header set (EC-Header Set) 515 included in the main chain, i.e., of a membership edge chain block, a Merkle Root hash value (EC-Merkle Root) 517 composed of the header set, and a main chain creation rule 519. The main chain creation rule includes Build parameters.

Figure 6A:
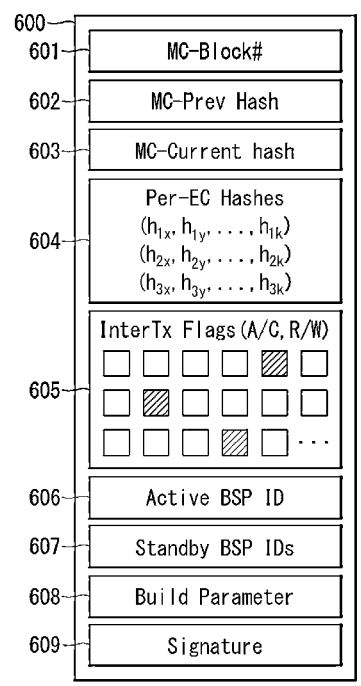
FIG. 6A is a diagram illustrating a data structure of a main chain audit transaction employable in a blockchain method for a mobile edge computing environment according to an embodiment of the present disclosure.
Figure 6B:
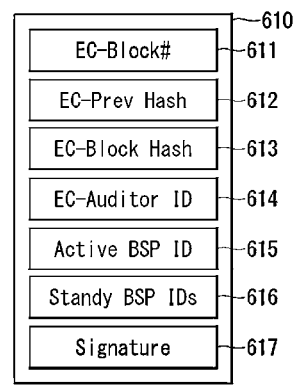
FIG. 6B is a diagram illustrating a data structure of a main chain employable in a blockchain method for a mobile edge computing environment according to an embodiment of the present disclosure.

FIG. 6A is a diagram illustrating a data structure of a main chain audit transaction employable in a blockchain method for a mobile edge computing environment according to an embodiment of the present disclosure. FIG. 6B is a diagram illustrating a data structure of a main chain employable in a blockchain method for a mobile edge computing environment according to an embodiment of the present disclosure.

With reference to FIG. 6A, the main chain audit transaction (MC-AuditTx) 600 includes a main chain block number (MC-Block #) 601, a main chain previous block hash value (MC-Prev Hash) 602, a main chain current hash value (MC-Current Hash) 603, an intra-main chain block edge chain block hash set (Per-EC Hasher) 604, and an inter-transaction execution result 605. Here, the inter-transaction execution result 605 includes an Abort or Commit bit (A/C) and a ReadWrite Set (R/W) and may be referred to as an inter-transaction flag (InterTx Flags).

In addition, the main chain audit transaction 600 may include a currently active blockchain service provider's identity (Active BSP) ID 606, a next waiting blockchain service provider's identity (Standby BSP IDs) 607, a main chain block creation rule 608, and a blockchain service provider's signature (Signature) 609 that created the main-chain block.

With reference to FIG. 6B, the edge chain audit transaction (EC-Audit Tx) 610 may be configured to include an edge chain block number (EC-Block #) 611, an edge chain block pre-Hash value (EC-Prev Hash) 612, an edge chain block hash value (EC-Block Hash) 613, an edge chain BSP auditor identity (EC-auditor ID) 614, an active BSP identity (Active BSP ID) 615, an identity of a BSP waiting for the next turn (Standby BSP ID) 616, and a signature of the BSP auditor (Signature) 617.

Figure 7:
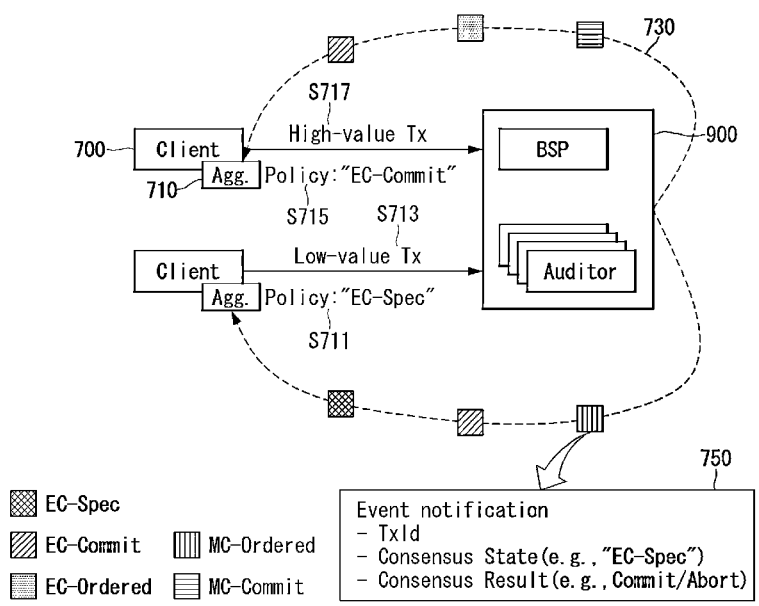
FIG. 7 is a diagram illustrating a process of selectively determining whether a final transaction is committed based on various consensus events and a determination policy received from a blockchain network by a user in a blockchain method for a mobile edge computing environment according to an embodiment of the present disclosure.

FIG. 7 is a diagram illustrating a process of selectively determining whether a final transaction is committed based on various consensus events and a determination policy received from a blockchain network by a user in a blockchain method for a mobile edge computing environment according to an embodiment of the present disclosure.

With reference to FIG. 7, the client 700 may selectively determine whether a transaction submitted by the client 700 is committed for each of various scenarios via an aggregator module 710. In detail, the aggregator module 710 receives an event message 750 through the transaction consensus level change event stream 730 and applies a transaction commitment policy to the event message to determine selectively whether or not to commit the transaction.

For example, in the case of a micropayment transaction, the aggregator module 710 of the client 700 may determine, at step S711, an edge chain speculation (EC-Spec), which is relatively fastest but has a relatively low reliability, as the policy. That is, when receiving the event message 750 for edge chain speculation from the blockchain network 900, the aggregator module 710 may transmit, at step S713, a low-value transaction (Low-value Tx) to the blockchain network 900 to commit the micropayment transaction selectively and finally.

As another example, in the case of a high-payment transaction, the aggregator module 710 of the client 700 may determine, at step S715, an edge chain commitment (EC-Commit) having a relatively high reliability and a relatively high delay as the policy. That is, when receiving the event message 750 for edge chain commitment from the blockchain network 900, the aggregator module 710 may transmit, at step S717, a high-value transaction (High-value Tx) to the blockchain network 900 to selectively determine whether to commit the corresponding high-payment transaction.

Meanwhile, the event message 750 may include a transaction ID (Txid) for event notification, a consensus state level, and consensus result information indicating whether the corresponding consensus state is committed or not. The event message 750 may include a consensus level event message, the consensus state level may include, for example, an edge chain speculation (EC-Spec), and the consensus result may include a result value of Commit or Abort.

Figure 8:
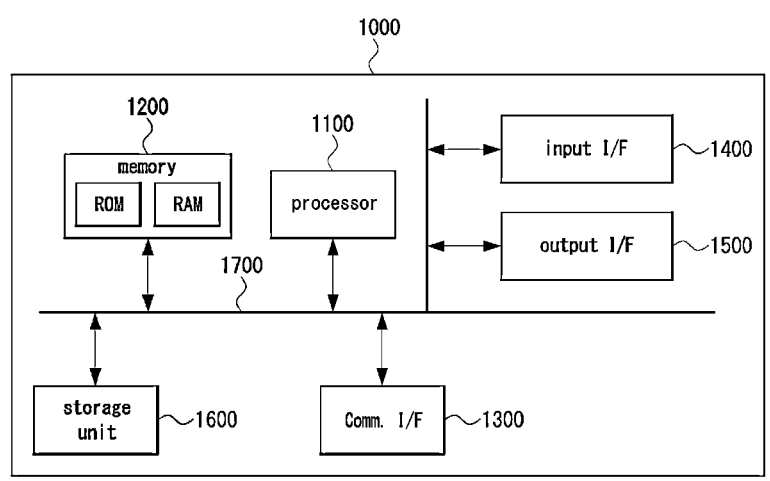
FIG. 8 is a block diagram illustrating a configuration applicable to a blockchain apparatus for a mobile edge computing environment according to another embodiment of the present disclosure.

FIG. 8 is a block diagram illustrating a configuration applicable to a blockchain apparatus for a mobile edge computing environment according to another embodiment of the present disclosure.

With reference to FIG. 8, the blockchain apparatus 1000 for a mobile edge computing environment may be configured to include at least one processor 1100 and a memory 1200 for storing at least one instruction executed by the processor 1100. The blockchain apparatus 1000 may also be configured to further include a communication unit (Comm. I/F) 1300 that is connected to a wired network, a wireless network, a satellite network, or a combination thereof to perform communication.

The blockchain apparatus 1000 may also be configured to optionally further include an input interface unit (Input I/F) 1400, an output interface unit (Output I/F) 1500, a storage unit 1600, etc. Each component included in the blockchain apparatus 1000 may be connected via a bus 1700 to communicate with each other or may be connected via an individual interface or an individual bus centering on at least one processor 1100. For example, the processor 1100 may be connected to at least one of the memory 1200, the communication unit 1300, the input interface unit 1400, the output interface unit 1500, and the storage unit 1600 via a dedicated interface.

The processor 1100 may execute a program instruction stored in at least one of the memory 1200 and the storage unit 1600. The processor 1100 may include: receiving, by at least one instruction or a program instruction, a user transaction related to the first edge chain from the user terminal; allocating a transaction processing order to user transactions; processing the transaction according to the transaction processing order and reading and updating data on the first edge chain or reading and updating data on the main chain of the main network according to the presence or absence of locality; creating a first block by collecting the processed transactions; propagating the first block to the local BSP auditor associated with the first edge chain and the main network; receiving an audit result analyzed by traversing the transactions in the first block from the local BSP auditor, and analyzing the audit transactions in the received audit result to verify whether there is a violation of stability and operability for a user transaction, and the like.

The processor 1100 of the blockchain apparatus 1000, may also be configured to perform, by at least one instruction, transaction processing on requests for service use from user terminals and stored the transaction processing result in the local edge chain; propagate transaction processing result to the local BSP auditors in the region in the form of a block; exchange the blocks created in the corresponding region with blockchain service providers in other regions constituting the main network; and read and analyze the edge chain states of blockchain service providers in different regions to create a global blockchain.

The processor 1100 may refer to a central processing unit (CPU), a graphics processing unit (GPU), or a dedicated processor on which methods according to embodiments of the present disclosure are performed.

Each of the memory 1200 and the storage unit 1600 may be configured as at least one of a volatile storage medium and a non-volatile storage medium. For example, the memory 1200 may be configured as at least one of a read only memory (ROM) and a random access memory (RAM).

The communication unit 1300 may include a communication interface or a sub-communication system for connection through a short-range wireless network or cable, connection with a satellite, connection with a base station of a mobile communication network, connection with a mobile edge core network or core network via ideal a backhaul link or non-ideal backhaul link in the base station, and the like. The communication unit 1300 may include a communication node generating a system log or a communication interface or a sub-communication system of a communication terminal.

The input interface unit 1400 may include an input signal processing unit that maps, to a prestored instruction, or processes a signal input through at least one input means selected among input means such as a keyboard, a microphone, a touch pad, and a touch screen.

The output interface unit 1500 may include an output signal processing unit mapping, to a prestored signal form or level, or processing a signal output under the control of the processor 1100 and at least one output means outputting a signal or information in the form of vibration or light according to a signal of the output signal processing unit. The at least one output means may include at least one selected among output means such as a speaker, a display device, a printer, an optical output device, and a vibration output device.

The above-described blockchain apparatus 1000 for the mobile edge computing environment may be implemented as a communicable desktop computer, a laptop computer, a notebook, a smart phone, a tablet personal computer (PC), a mobile phone, a smart watch, a smart glass, an e-book reader, a portable multimedia player (PMP), a portable game console, a navigation device, a digital camera, a digital multimedia broadcasting (DMB) player, a digital audio recorder, a digital audio player, digital video recorder, digital video player, a personal digital assistant (PDA), etc.

According to the present disclosure, when constructing a blockchain in the Mobile Edge Computing (MEC) environment, the two-level blockchains composed of an edge chain guaranteeing consistency within one region and a main chain guaranteeing global consistency between regions are defined and used, which make it possible to process ultra-low-latency transaction of mobile edge computing, define blockchain consensus by subdividing the blockchain consensus into multiple stages of which reliability level increases over time to support various user scenarios, enable the user to self-determine various consensus reliability levels to the transaction, which the user summited, according to the trade-off relationship between the consensus completion speed and its reliability level.

Also, according to the present disclosure, it is possible to selectively determine consensus reliability according to various requirements of the user with a configuration allowing a BSP physically located nearby to quickly process the transaction submitted by the user terminal in consideration of locality.

The method according to an embodiment of the present disclosure may be implemented as a computer-readable program or code on computer-readable recording media. Computer-readable recording media include all types of recording devices in which data readable by a computer system are stored. The computer-readable recording media may also be distributed in a network-connected computer system to store and execute computer-readable programs or codes in a distributed manner. The computer-readable recording medium may also include a hardware device specially configured to store and execute program instructions, such as a read only memory (ROM), a random access memory (RAM), and a flash memory. The program instructions may include not only machine language codes such as those generated by a compiler, but also high-level language codes that executable by a computer using an interpreter or the like.

Although some aspects of the present disclosure have been described in the context of an apparatus, it may also represent a description according to a corresponding method, wherein a block or apparatus corresponds to a method step or feature of a method step. Similarly, aspects described in the context of a method may also represent a corresponding block or item or a corresponding device feature. Some or all of the method steps may be performed by (or using) a hardware device, e.g., a microprocessor, a programmable computer, or an electronic circuit. In some embodiments, one or more of the most important method steps may be performed by such an apparatus.

In embodiments, a programmable logic device, e.g., a field programmable gate array, may be used to perform some or all of the functions of the methods described herein. In embodiments, the field programmable gate array may operate in conjunction with a microprocessor to perform one of the methods described herein. In general, the methods are preferably performed by a certain hardware device.

Although described above with reference to the preferred embodiments of the present disclosure, it should be understood that those skilled in the art can variously modify and change the present disclosure within the scope without departing from the spirit and scope of the present disclosure as set forth in the claims below.

What is claimed is:

1. A blockchain method of a blockchain service provider (BSP) server being connected to a main network in a mobile edge computing (MEC) environment and including at least one hardware processor configured to execute computer-readable instructions stored in a memory, the method comprising:

receiving, by the at least one hardware processor, user transactions from clients or audit transactions from local BSP auditor nodes associated with a first edge chain;

assigning, by the at least one hardware processor, a transaction processing order of the received transactions;

processing, by the at least one hardware processor, the transactions according to the transaction processing order corresponding to an execution order, wherein the transactions are processed by updating data on the first edge chain for intra-region transactions, or updating data on a main chain for inter-region transactions;

generating, by the at least one hardware processor, an edge chain block from the processed transactions and verifying the edge chain block based on a hash chain consistency verification;

propagating, by the at least one hardware processor, the edge chain block to all local BSP auditor nodes associated with the first edge chain and all BSP servers in the main network including BSP servers in other regions;

receiving, by the at least one hardware processor, a second block of a BSP server managing a second edge chain of another region from the main network;

generating, by the at least one hardware processor, a main chain block by aggregating second blocks and verifying data consistency using multi-version concurrency control (MVCC);

generating, by the at least one hardware processor, a main chain audit transaction for the main chain block;

propagating, by the at least one hardware processor, the main chain audit transaction to the main network; and storing all client transactions and audit transactions in the edge chain block on the first edge chain, wherein auditor nodes perform on-chain auditing, including inspection of behavior of the BSP server on the first edge chain, creation of an audit transaction on the edge chain block, and transmission of the audit transaction to the BSP server on the first edge chain, wherein the BSP server on the first edge chain is a single mobile edge computing node that performs blockchain service operations for clients in a single region, and wherein each of the main chain block, the main chain audit transaction, and the audit transaction comprises one or more hash values.

2. The blockchain method of claim 1, further comprising:

after receiving the edge chain block, traversing the transactions in the edge chain block;

determining, by the at least one hardware processor, presence or absence of malicious attacks by any BSP server;

sending, by the at least one hardware processor, an audit transaction to a BSP server associated with the first edge chain based on a previous decision; and transmitting, by the at least one hardware processor, a result event from a BSP auditor to a client.

3. The blockchain method of claim 1, further comprising propagating, by the at least one hardware processor, the second block to BSP auditors on the first edge chain and other BSP server nodes on the main network, wherein an on-chain audit result from the BSP auditor performing on-chain audit on the second block is inserted into the first edge chain, wherein the second block on the first edge chain comprises the user transactions and main chain audit transactions received from other BSP servers in the main network.

4. The blockchain method of claim 3, further comprising transmitting to a client, by the at least one hardware processor, an update result of consensus state which is determined by analysis on all audit transactions for the main chain block.

5. The blockchain method of claim 1, further comprising performing, by the at least one hardware processor, multi-version concurrency control validation by traversing the transactions in the main chain block.

6. A blockchain method of a blockchain service provider (BSP) server being connected to a main network in a mobile edge computing (MEC) environment and including at least one hardware processor configured to execute computer-readable instructions stored in a memory, the method comprising:

receiving, by the at least one hardware processor, user transactions from clients or audit transactions from local BSP auditor nodes associated with a first edge chain;

assigning, by the at least one hardware processor, a transaction processing order of the received transactions;

processing, by the at least one hardware processor, the transactions according to the transaction processing order corresponding to an execution order, wherein the transactions are processed by updating data on the first edge chain for intra-region transactions, or updating data on a main chain for inter-region transactions;

generating, by the at least one hardware processor, an edge chain block from the processed transactions and verifying the edge chain block based on a hash chain consistency verification;

propagating, by the at least one hardware processor, the edge chain block to all local BSP auditor nodes associated with the first edge chain and all BSP servers in the main network including BSP servers in other regions;

receiving, by the at least one hardware processor, a second block of a BSP server managing a second edge chain of another region from the main network;

generating, by the at least one hardware processor, a main chain block by aggregating second blocks and verifying data consistency using multi-version concurrency control (MVCC);

generating, by the at least one hardware processor, a main chain audit transaction for the main chain block;

propagating, by the at least one hardware processor, the main chain audit transaction to the main network;

storing, by the at least one hardware processor, all client transactions and audit transactions in the edge chain block on the first edge chain, wherein auditor nodes perform on-chain auditing, including inspection of behavior of the BSP server on the first edge chain, creation of an audit transaction on the edge chain block, and transmission of the audit transaction on the edge chain block, to the BSP server on the first edge chain; and transmitting, by the at least one hardware processor, an update result of consensus state to a client based on on-chain auditing, wherein each of the main chain block, the main chain audit transaction, and the audit transaction comprises one or more hash values.

\* \* \* \* \*